United States Patent
Hirata et al.

(10) Patent No.: US 6,462,838 B1
(45) Date of Patent: Oct. 8, 2002

(54) METHOD OF AND APPARATUS FOR FORMING AN IMAGE

(75) Inventors: Katsuyuki Hirata, Aichi-Ken; Kentaro Katori, Toyokawa, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/275,294

(22) Filed: Mar. 24, 1999

(30) Foreign Application Priority Data

Mar. 25, 1998 (JP) .......................................... 10-076846
Mar. 30, 1998 (JP) .......................................... 10-083167

(51) Int. Cl.$^7$ .......................... H04N 1/407; H04N 1/50; G06K 15/02
(52) U.S. Cl. ........................ 358/3.05; 358/504; 358/521
(58) Field of Search .......................... 358/1.9, 455, 456, 358/466, 298, 534, 504, 521; 382/252, 237, 270

(56) References Cited

U.S. PATENT DOCUMENTS 5,694,223 A     12/1997  Katori et al. ................ 358/300
5,710,836 A  *  1/1998   Shiau et al. ................. 382/252
6,249,357 B1 *  6/2001   Metcalfe et al. ............. 358/1.9

FOREIGN PATENT DOCUMENTS

JP          5-103207       4/1993        ............ H04N/1/40

* cited by examiner

Primary Examiner—Scott Rogers
(74) Attorney, Agent, or Firm—Sidley Austin Brown & Wood

(57) ABSTRACT

A method of and apparatus for forming an image adapted to apply an error diffusion method to an input image data having N gradations so as to convert it into an output image data having M gradations, where M<N. Correspondence between N-stage gradation levels of the input image data and M-stage gradation levels of the output image data can be varied. This apparatus for forming an image has control means for setting the aforesaid correspondence in accordance with data obtained from the measurement of the image densities of a printout having specific gradation levels which do not give rise to errors in the aforesaid conversion.

17 Claims, 16 Drawing Sheets

METHOD OF AND APPARATUS FOR FORMING AN IMAGE

BACKGROUND OF THE INVENTION

This application is based on Japanese Patent Application No. 76846/1998 filed on Mar. 25, 1998 and No. 83167/1998 filed on Mar. 30, 1998, the contents of which are incorporated herein by reference.

1. Field of the Invention

This invention relates to a method of and apparatus for forming an image on a multilevel gradation, and will be found advantageous when used in forming an image by electrophotography in which exposure is subjected to multi-valued control.

2. Description of the Prior Art

Various types of image-forming apparatuses such as digital copying machines and page printers have been employed for printing out image data. In these apparatuses, it is most common to reproduce half tones on a multilevel gradation by a combination of multi-valued density control for each pixel and quasi-gradation (quasi-continuous tone) control for each pixel matrix. The density control for each pixel is effected, e.g., by pulse width modulation (PWM) and/or intensity modulation to which a light source for use in exposure in electrophotography is subjected, while the technique commonly in use for the quasi-gradation control is an error diffusion method, which is briefly summarized in the following paragraph:

Ordinarily, 4 to 8 gradations can be reproduced for each pixel. 4 and 8 gradations correspond to 2 and 3 bits respectively. This means that only a small number of gradations can be reproduced for each pixel as compared with 256 gradations which correspond to 8 bits and by which an original image data is constituted. Consequently, image processing which has previously been effected in the apparatuses of the kind indicated above is characterized in that an input image data representing an original image is converted into an output image data having a smaller number of bits than the input image data, that this data conversion would give rise to an error in the number of bits used to represent each pixel, and that this error is distributed among pixels disposed around the pixel involved.

Conventionally, one has not failed to see a fixed correspondence between the gradation levels of the input image data and those of the output image data, with the exception of some cases where the marginal zone of the output image data has a different number of gradations from the remaining zone thereof so that the edge sharpness of the original image may be maintained and gradation reproduction in the remaining zone may be allowed to proceed smoothly.

With respect to an electrophotographic image-forming apparatus having a function to form a toner powder image of a prescribed pattern, it is known to subject the toner powder image to automatic image density control (AIDC), in which the conditions for image formation such as electric potential applied to a photoreceptor are adjusted in accordance with the measured value of the image density of the toner powder image.

Because of the aforesaid fixed correspondence between the gradation levels of the input image data and those of the output image data, gradation reproduction obtainable from the prior art image-forming apparatuses depends on the conditions for image formation such as temperature, humidity, ratio of toner to developer, and surface characteristic of photoreceptor. This dependence makes the quality of a reproduced image unstable such that the image density of an image actually printed out differs from that specified by an input image data, the difference therebetween being caused by error diffusion effected on the basis of the gradation level of the output image data irrespective of a change in the image density of a printout, such a change being in turn caused by a change in a photographic situation or conditions for image formation. Especially, in case where the difference between the gradation levels of the input image data and those of the output image data is added to the subsequent input image data, the gradation level of a new output image data is determined by the result of this addition and may yield an irregular, instead of a proper, image density throughout an entire printout. This is the very reason why the image density of an image actually printed out differs from that specified by an input image data. In case of an apparatus for forming a color image from a plurality of toner powder images of various colors, a change in the gradation reproduction is prominently manifested by a change in the reproduced colors.

SUMMARY OF THE INVENTION

The present invention is concerned with eliminating the aforesaid difficulty. As such, the primary object of the invention is to provide a method of and apparatus for forming an image capable of effecting constant gradation reproduction and printing out images stable in quality.

According to an embodiment of the invention, correspondence between the gradation levels of the input image data and those of the output image data is varied on the basis of reproduced image densities measured at one or preferably more points in a printout method. In order to vary the aforesaid correspondence on the basis of densities measured at a plurality of points, the image may be partitioned into regions corresponding to these points so that the aforesaid correspondence may be varied in each of these regions. Alternatively, image densities reproduced in positions disposed in areas between these points may be inferred from measured values obtained at these points so that the aforesaid correspondence may be varied in regions into which the image is more finely partitioned.

According to a further feature, a larger number of gradations than those by which an output image data is to be constituted are subjected to arithmetic operations so that the number of gradations corresponding to the difference between a measured value and a desired density may be made sufficiently large and thereby as many choices as possible may be provided in determining the aforesaid correspondence.

In one described embodiment, an apparatus for forming an image is adapted to apply the error diffusion method to an input image data having $2^n$ gradations so as to convert it into an output image data having $2^m$ gradations, where n is an integer which is equal to or more than 3, and m is an integer which is less than n and is equal to or more than 2. Correspondence between N-stage gradation levels of the input image data and M-stage gradation levels of the output image data can be varied to suit requirements, where N and M are equal to $2^n$ and $2^m$ respectively. This apparatus for forming an image has control means for setting the aforesaid correspondence in accordance with data obtained from the measurement of the image densities of a printout having specific gradation levels which do not give rise to errors in the aforesaid conversion.

DESCRIPTION OF THE PREFERRED EMBODIMENTS

Since the present invention can be beneficially applied to a digital copying machine, its working parts having a function to print out image data will be explained briefly at the outset. Then, the construction peculiar to this invention will be described.

Construction of the Entire Machine

Figure 1:
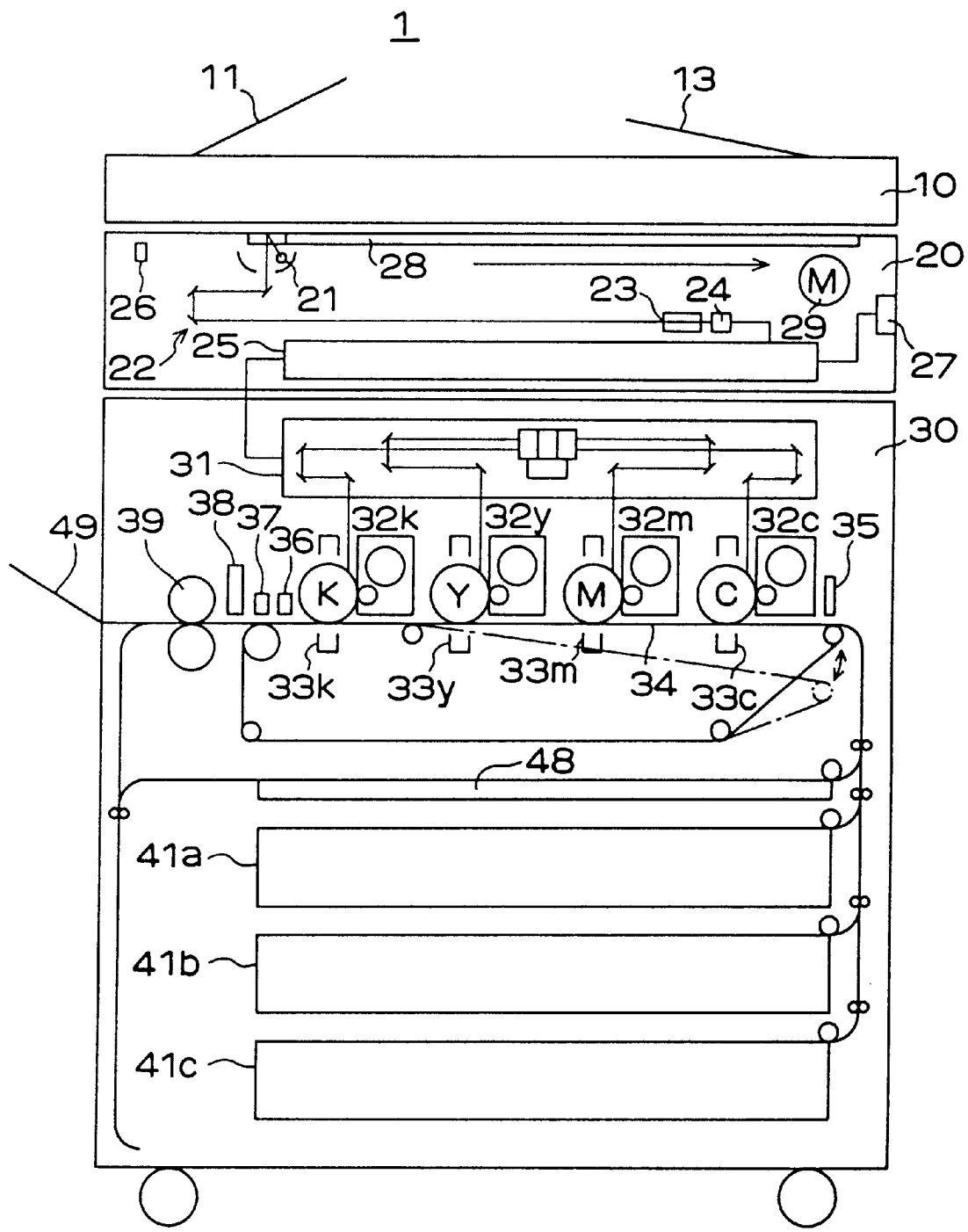
FIG. 1 is a view showing the entire copying machine of the present invention.

FIG. 1 is a view showing the entire copying machine 1 of the present invention.

The copying machine 1 is a digital color copying machine having an automatic document feeder 10, reduction type image reader 20 and electrophotographic printer 30. An interface 27 makes it possible to effect data communications between an external device and the copying machine 1. More specifically stated, image data read by the image reader 20 are transmitted to the external device through the interface 27, and image data received from the external device therethrough are provided to the printer 30 so as to be printed.

The document feeder 10 forwards a document placed in a document stacking and holding tray 11 to a position in which the image data appearing in the document are to be read in the image reader 20. When the image data have been read, the document is deflected into an output tray 13. Each document is advanced to the aforesaid image reading position in accordance with a command provided from a control panel (not shown), and is advanced to the output tray 13 in response to a signal received from the image reader 20 at the end of image reading. When a stack of documents is placed in the tray 11, the aforesaid command and signal are provided sequentially to the end that the repetition of a series of the aforesaid steps is rendered efficient.

In the image reader 20, a lamp 21 illuminates the document on a platen 28. Light rays reflected from the document strike an array of mirrors 22 one after another and are incident on a CCD image sensor 24 via an image-forming objective 23. When a motor 29 coupled to a scanner carrying the lamp 21 and the first of the mirrors 22 is energized, it causes the scanner to advance in a subscanning direction (FIG. 12) so that the whole surface of the document may be scanned at a speed V proportional to the desired expansion or reduction ratio. As the scanner is advanced, the second and the third of the mirrors 22 are also advanced at a speed V/2 in the same direction as the scanner so that the length of a light path extending from the lamp 21 to the CCD image sensor 24 may be kept constant. The position of the scanner is controlled on the basis of the distance by which the scanner is moved after the moment when a sensor 26 detects the scanner leaving its home position. The aforesaid distance is calculated from the number of pulses by which the motor 29 is driven. The image reader 20 reads the document with a resolution of 400 dpi.

Each of different colors, i.e. red (R), green (G) and blue (B), of which the light rays incident on the CCD image sensor 24 are composed, is subjected to photoelectric transfer therein. In an image processing circuit 25, the photoelectric transfer signal representing each color is subjected to analog signal processing, analog-to-digital (A/D) conversion and digital image processing. Image data thus obtained from the document are transmitted from the image processing circuit 25 either to the interface 27 or to the printer 30.

A white board for shading correction is disposed outwardly of a region in which the document on the platen 28 is read. Prior to reading the document, the white board is read to produce data for shading correction.

The printer 30 includes a data processing system incorporated in a print head 31. The data processing system furnishes a structure to which an apparatus for forming an image constituting the present invention corresponds, and is operable such that image data transmitted from the image reader 20 are converted into printing data for printing cyan (C), magenta (M), yellow (Y) and black (K). A control unit incorporated in the print head 31 allows a semiconductor laser to emit radiation in accordance with the printing data for each color. Laser beams are pivoted by means of a polygon mirror in a main scanning direction (FIG. 12), and are directed by means of four arrays of mirrors toward photoreceptors incorporated in imaging units 32c, 32m, 32y and 32k respectively.

Each of the imaging units 32c, 32m, 32y and 32k includes, in addition to the photoreceptor, various components required for electrophotography. Each photoreceptor is rotated in a clockwise direction so that charging, exposure, development and transference may be effected sequentially. The imaging units 32c, 32m, 32y and 32k are separated from each other so as to be individually demountable.

Toner powder images are obtained by developing electrostatic latent images on the photoreceptors, and are transferred to a copy sheet in order of C, M, Y and K by means of corona generating devices 33c, 33m, 33y and 33k disposed in opposed relationship to the respective photoreceptors. A belt 34 for the transport of copy sheets can be moved in a space defined between the photoreceptors and the corona generating devices 33c, 33m, 33y and 33k. In case of taking a monochromatic copy requiring the use of only the imaging unit 32k, the belt 34 is swung to a position shown in dot-dash lines in FIG. 1 so that the photoreceptors co-operating with the imaging units 32c, 32m and 32y respectively may be prevented from getting rapidly worn.

A sensor 36 for correcting misregistration, AIDC sensors 37, cleaner 38 and a pair of fuser rollers 39 are provided downstream of the imaging unit 32k. Copy sheets are delivered to a delivery tray 49 when they have been subjected to the fusing process. The sensor 36 detects color misregistration. Signals developed by the sensor 36 are used for correcting the position and/or distortion of an image. The AIDC sensors 37 are photosensors for detecting the image densities of the AIDC patterns (FIG. 12) corresponding to test patterns of the present invention. They are toner powder images formed in the areas of the belt 34 which are defined between the edges of a copy sheet and the edges of the belt 34. The provision of the AIDC patterns serves the purpose of analyzing image densities reproduced. The AIDC patterns are erased by the cleaner 38.

Copy sheet cassettes 41a, 41b and 41c are located below the belt 34. A copy sheet of desired size is supplied from one of these cassettes to the path of movement of copy sheets by means of a pick-up roll and delivered to the belt 34 by means of a roller assembly. The belt 34 begins to advance the copy sheet as soon as a sensor 35 provided upstream of the imaging unit 32c detects a reference mark put on the belt 34. Copy sheets are delivered to the delivery tray 49 when they have been subjected to the electrophotographic process and the fusing process. When copies of a document are to be taken on both sides of a copy sheet, the copy sheet after passage through the fuser rollers 39 is transferred to a duplex tray 48 by a switch-back and fed therefrom back to the belt 34.

Signal Processing in the Image Reader

Figure 2:
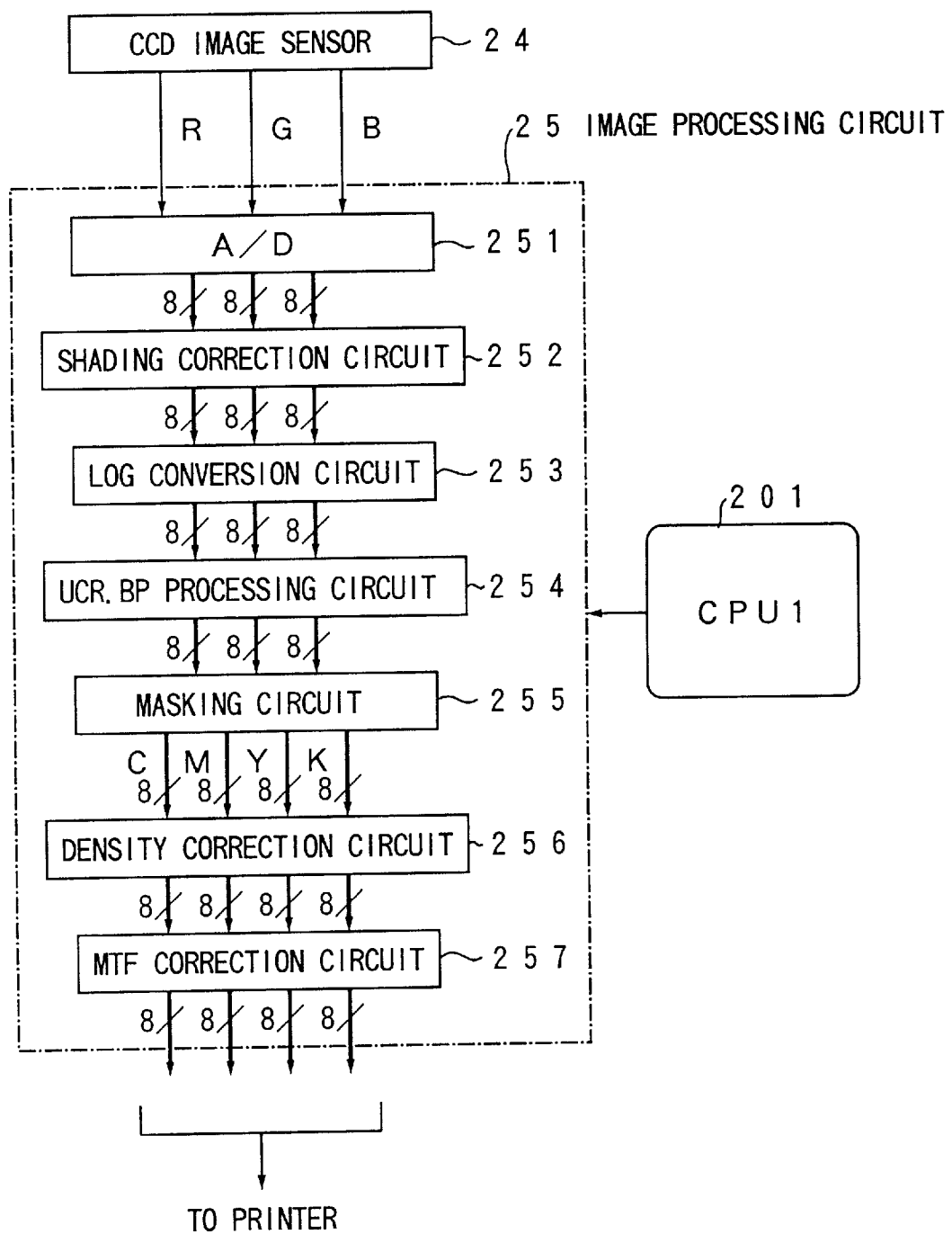
FIG. 2 is a block diagrammatic representation of an image processing circuit incorporated in an image reader.

FIG. 2 is a block diagrammatic representation of an image processing circuit 25 incorporated in the image reader 20.

The image processing circuit 25 comprises an A/D converter circuit 251, shading correction circuit 252, log conversion circuit 253, UCR.BP processing circuit 254, masking circuit 255, density correction circuit 256, MTF correction circuit 257, and other circuits (not shown) for allowing the image reader 20 to have additional functions. A central processing unit (CPU) 201, by which the image reader 20 is controlled, gives commands to these circuits. Nonlimiting examples of the aforesaid other circuits are a circuit for correcting the chromatic aberration of an optical system allotted for image reading, circuit for editing an image (e.g. enlarging or contracting it), and circuit for preventing the forgery of securities and paper money.

In the A/D converter circuit 251, the gain and offset of an analog signal transmitted from the CCD image sensor 24 are corrected. Then, each of different colors R, G and B, of which the analog signal is composed, is converted into an 8-bit per a pixel image data having 256 gradations. In the shading correction circuit 252, irregular distribution of light emitted from the lamp 21 and difference in sensitivity among the pixels of the CCD image sensor 24 are corrected for the image data representing the aforesaid three colors respectively. In the log conversion circuit 253, image data representing the luminance are converted into those representing the image density based on human spectral luminous efficiency. In the UCR.BP processing circuit 254, dark colors to be reproduced with black toner are extracted from image data, and the values of the image data on R, G and B are corrected in conformity with extracted values. In the masking circuit 255, image data on C, M, Y and K are produced on the basis of the corrected image data on R, G and B. In the color correction carried out by the density correction circuit 256, the image data on C, M and Y are multiplied by predetermined coefficients. In order to improve picture quality, the MTF correction circuit 257 performs functions such as smoothing and filtering. The output of the MTF correction circuit 257 is provided to the printer 30 as printing data.

Filtering action effected in the MTF correction circuit 257 by the utilization of a first-order differentiation filter and a Laplacian filter, both of which are commonly in use, will be hereinafter more fully described.

Figure 5:
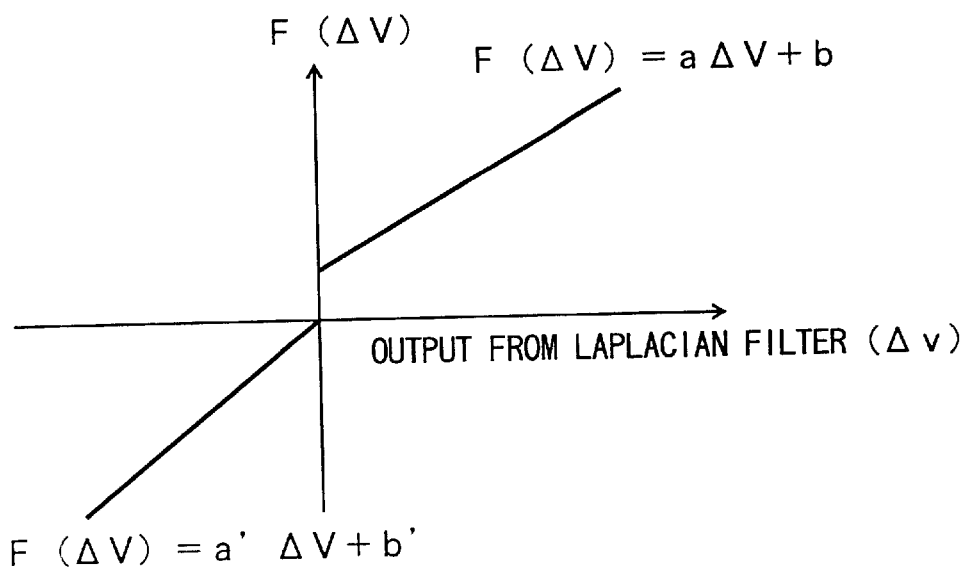
FIG. 5 is a view showing correction functions for spatial frequencies.
Figure 6:
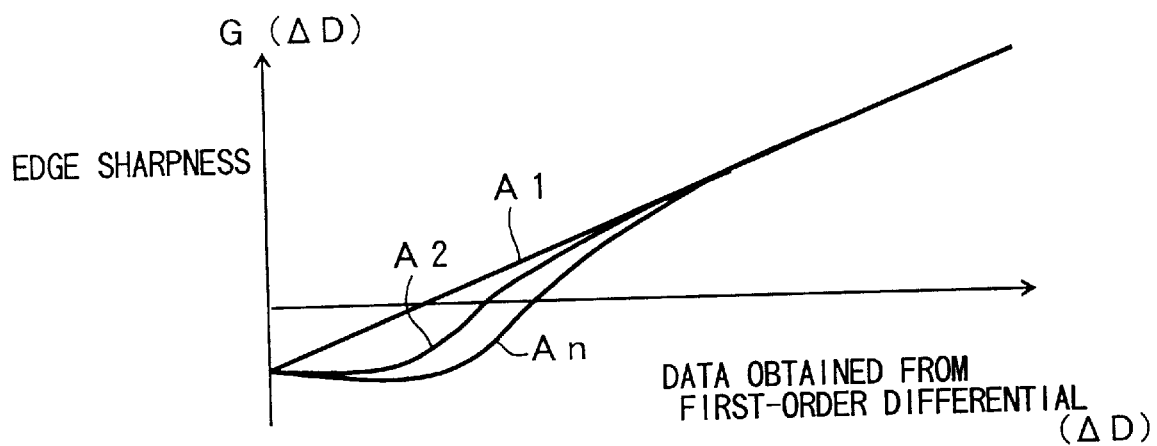
FIG. 6 illustrates the relationship between data obtained from first-order differential and edge sharpness.

The relationship between the input D and the output DD of the MTF correction circuit 257 can be expressed as:

$$DD=D\times[F(\Delta V)\times G(\Delta D)]$$

where $\Delta V$ is a Laplacian data on lightness V obtained when a color space based on the RGB calorimetric system is converted into a color space based on the VHC calorimetric system, $F(\Delta V)$ is the correction function for spatial frequencies shown in FIG. 5, $\Delta D$ is a value obtained when an input data (representing an image density) from the density correction circuit 256 is subjected to first-order differential, and $G(\Delta D)$ is an output representing edge sharpness shown in FIG. 6. In this embodiment, when a value of $G(\Delta D)$ is greater than a predetermined threshold value, a pixel from which the aforesaid value of $G(\Delta D)$ is obtained is regarded as representing the edge of an image and is allowed to develop an edge detection signal (FIG. 3) which, together with the image data, is provided to the printer 30 for use in controlling the reproduction of half tones.

Figure 3:
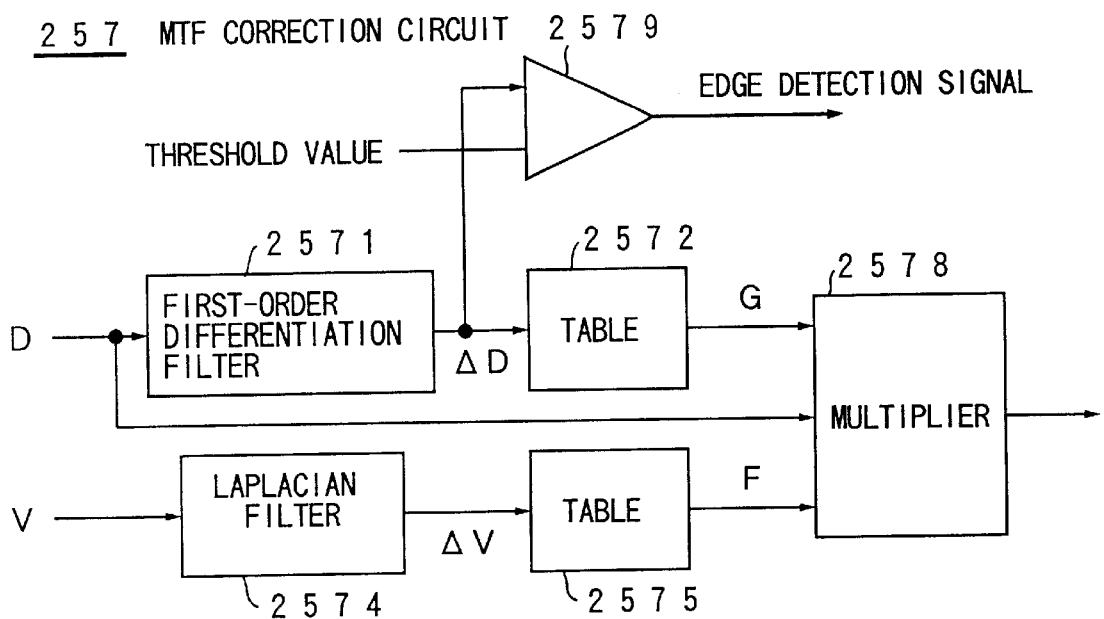
FIG. 3 is a block diagrammatic representation of a circuit for the correction of a modulation transfer function (MTF)
Figure 4:
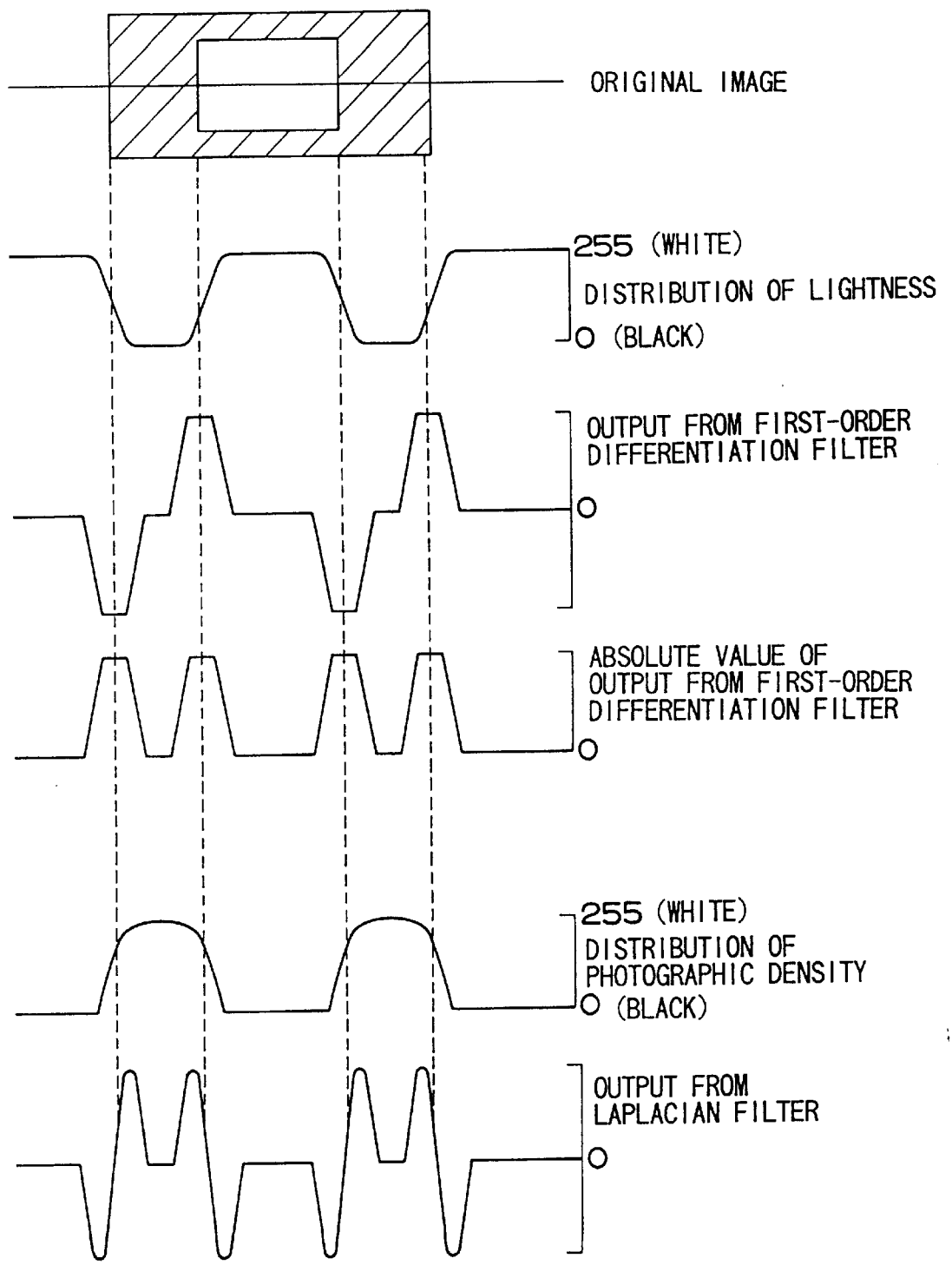
FIG. 4 is a view of an illustrative example of output waveforms obtained therefrom.

FIG. 3 is a block diagrammatic representation of the MTF correction circuit 257, and FIG. 4 is a view of an illustrative example of output waveforms obtained therefrom.

An image data D received from the density correction circuit 256 is differentiated in a first-order differentiation filter 2571. A value $\Delta D$ obtained from this differential is provided to a first table 2572, from which a signal $G(\Delta D)$ indicating edge sharpness is taken. The value of this signal is a function of the value $\Delta D$. The lightness V is differentiated in a Laplacian filter 2574. A value $\Delta V$ obtained from this differential is provided to a second table 2575, from which a correction function $F(\Delta V)$, i.e. a function of the value $\Delta V$, is taken. A multiplier 2578 performs multiplication of the image data D, signal $G(\Delta D)$ and correction function $F(\Delta V)$. The value $\Delta D$ obtained from the first-order differentiation filter 2571 is provided also to a comparator 2579, which develops an edge detection signal when the value $\Delta D$ is greater than a predetermined threshold value.

It will be seen from FIG. 4 that four edges are encountered when an original image of hollow formation is read along a line which traverses it and that a change in edge sharpness along this line is blunted as compared with a change in the brightness of the original image per se along this line.

FIG. 5 is a view showing correction functions $F(\Delta V)$ for spatial frequencies.

The relationship between the aforesaid value ΔV and the correction function F(ΔV) can be expressed as:

$$F(\Delta V) = a \cdot \Delta V + b \quad (2)$$

$$F(\Delta V) = a' \cdot \Delta V + b' \quad (2')$$

Equation (2) applies when the value ΔV is positive, and equation (2') applies when the value ΔV is negative. The positive and negative values ΔV indicate that the scanner carrying the lamp 21 and the first of the mirrors 22 is passing under the image per se and the ground color of the document respectively. As will be seen in FIG. 5, the correction function F(ΔV), i.e. the output DD of the MTF correction circuit 257, swings positive when the value ΔV is positive and swings negative when the value ΔV is negative. Consequently, a high degree of contrast between one and the other sides of the edge is obtained.

FIG. 6 illustrates the relationship between data ΔD obtained from first-order differential and edge sharpness G(ΔD).

The negative edge sharpnesses G(ΔD) represent half-tone areas, while the positive edge sharpnesses G(ΔD) represent edges. Straight and curved lines $A_1$, $A_2$ and $A_n$ shown in FIG. 6 represent the first, second and n th functions $G_1(\Delta D)$, $G_2(\Delta D)$ and $G_n(\Delta D)$ for the first, second and nth main scanning lines respectively counted in the subscanning direction. An edge sharpness at the n th pixel counted in the subscanning direction can be found from the function $G_n(\Delta D)$ when a data ΔD is obtained from first-order differential with respect to that pixel. The functions $G_1(\Delta D)$ to $G_n(\Delta D)$ are stored in the form of the aforesaid table 2572 in the MTF correction circuit 257. When they assume negative values, a smoothing filter suited to the values is selected. Nonlimiting examples of the smoothing filter are an averaging filter and a filter which permits only the median or running average of the aforesaid values to flow.

Referring again to FIG. 6, the edge sharpness G(ΔD) swings positive when the value ΔD becomes greater than a threshold value. Then the output DD of the MTF correction circuit 257 is regarded as representing the edge of an image, and an edge signal is developed as has been above explained. The magnitude of the value G(ΔD) is substantially proportional to that of the value ΔD. As shown in FIG. 4, a change in edge sharpness is ordinarily blunted as compared with a change in the brightness of the original image per se.

Signal Processing in the Printer

As has been above explained, the printer 30 includes four tandem-compound imaging units 32c, 32m, 32y and 32k, which are put to use at a time for forming a color image. During a single scan period, printing data for printing C, M, Y and K are transferred at a time from the image reader 20 to the printer 30 so as to permit the latter to subject these four colors to parallel processing.

It is of prime importance in the color copying to transfer the toner powder images of four colors to a copy sheet so as not to be out of registration. In order to effect complete registration between toner powder images notwithstanding the fact that four imaging units 32c, 32m, 32y and 32k are equidistantly spaced along the path of movement of copy sheets, a printing process ranging from exposure to transference should be carried out with a time delay introduced for each color. This means that printing data provided at a time to the printer 30 for printing four colors should be subjected to exposure control at different instants from each other. The time delay to be introduced for each color is determined by the speed at which the copy sheets are advanced and the spaced relation in which the photoreceptors are disposed to each other. Since four laser beams are pivoted by means of a single polygon mirror, two laser beams directed toward two photoreceptors allotted to two colors disposed at the downstream side in the path of movement of copy sheets, i.e. Y and K, are pivoted in the opposite main scanning direction as compared with two laser beams directed toward two photoreceptors allotted to two colors disposed at the upstream side, i.e. C and M. Misregistration will occur also when a position on the surface of a photoreceptor toward which a laser beam is directed is offset in the main scanning direction with respect to a position on the surface of a preceding photoreceptor toward which a preceding laser beam was directed, when an expansion or reduction ratio is distorted in the main scanning direction, when a data signaling rate is distorted in the subscanning direction, and when a skew distortion is caused by the angular deviation of a direction in which a laser beam is pivoted from the axial direction of a photoreceptor. The present invention solves the aforesaid problems by providing the printer 30 with delayline memories having a capacity just large enough to satisfy the requirements and with a correction circuit for the prevention of misregistration. The printer 30 is provided also with a memory unit for storing an image to be transferred to one side of a copy sheet when copies of a document are to be taken on both sides of the copy sheet.

Figure 7:
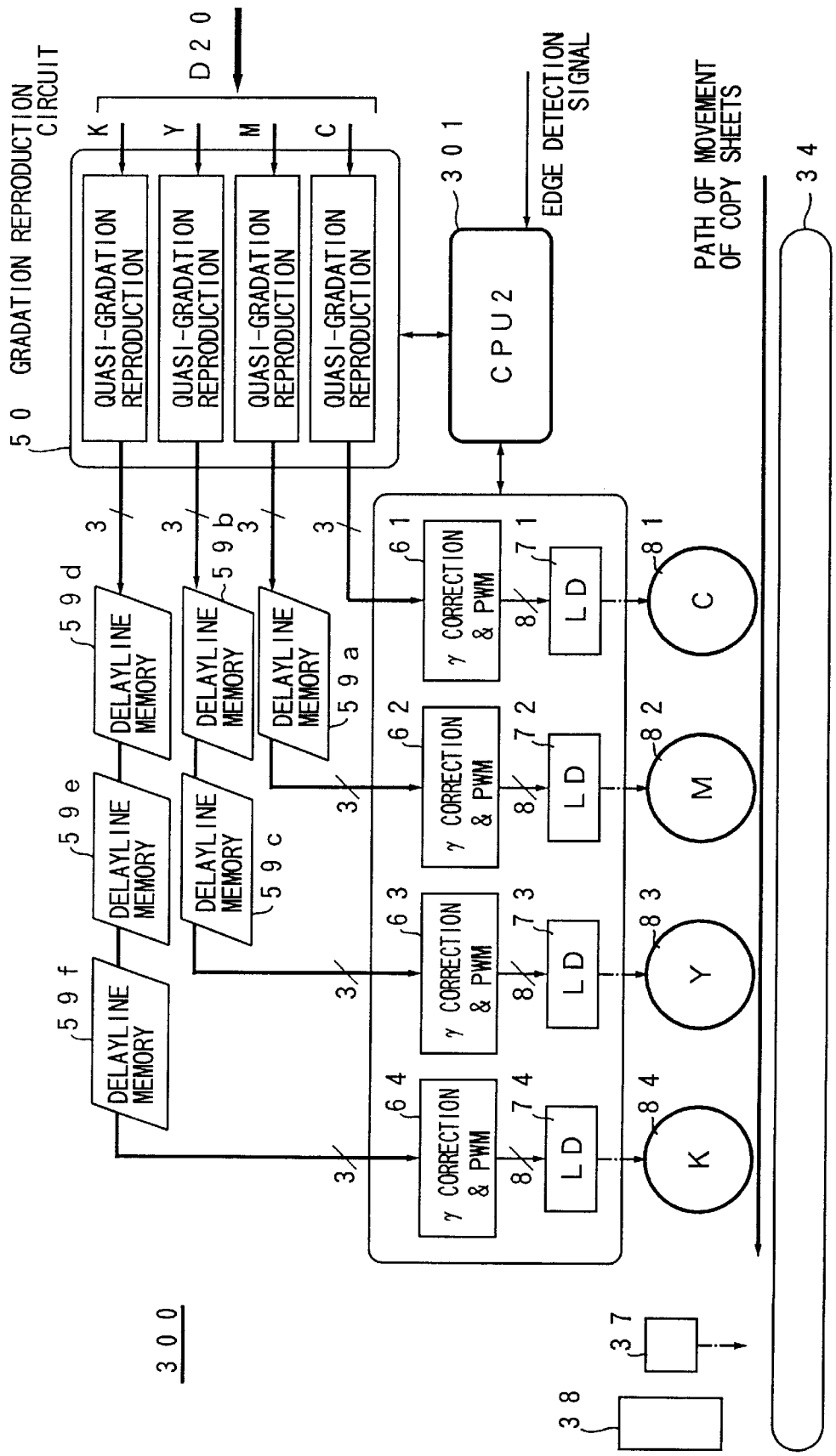
FIG. 7 provides a diagrammatic illustration of a signal processing system incorporated in a printer.

FIG. 7 provides a diagrammatic illustration of a signal processing system 300 incorporated in the printer 30.

Image data D20 on C, M, Y and K transferred from the image reader 20 are provided to a gradation reproduction circuit 50, in which an 8-bit(256 gradations) image data D20 on each color is converted into a 3-bit data on quasi-gradations (8 gradations, for example). This conversion is effected by multi-valued error diffusion of the character-separation type as will appear hereinafter. A CPU 301, by which the printer 30 is controlled, gives a command to effect this conversion. In order to improve edge sharpness, the edge of an image is subjected to simple ternarization instead of being subjected to multi-valued error diffusion. The mode of processing will change from the former to the latter and vice versa every time a gradation reproduction attribute signal, i.e. a LIMOS signal, is received from the image reader 20.

In a circuit for the correction of image distortion (not shown), an expansion or reduction ratio distorted in the main scanning direction, a data signaling rate distorted in the subscanning direction, and a skew distortion are corrected with respect to C, M and Y. This correction is effected by gradation level interpolation on the basis of magnitude in which C, M and Y are found to deviate from K in a test conducted with a test pattern for detecting misregistration. According to the results of another test conducted for testing the ability to recognize paper money, it may become necessary to replace data subjected to the aforesaid correction with data representing an image blackened all over.

As has been above explained, when the image data on each color has been subjected to bit rate reduction in the gradation reproduction circuit 50, a time delay is introduced by delayline memories 59a to 59f, which need not be large-capacity memories because they have only to store 3-bit image data instead of 8-bit image data. Then the image data on four colors are provided to control circuits 61 to 64 respectively, in which these image data are subjected to γ correction and PWM such that gradation distortion caused by overall gamma deviated from 1 during an electrophotographic process is corrected and pulses subsequently generated have a modulated width and a duty ratio suited to the values of the image data resulting from the aforesaid correction of gradation distortion. The aforesaid pulses effect on-off control over semiconductor lasers 71 to 74, which are light sources for illuminating photoreceptors 81 to 84 respectively.

Figure 8:
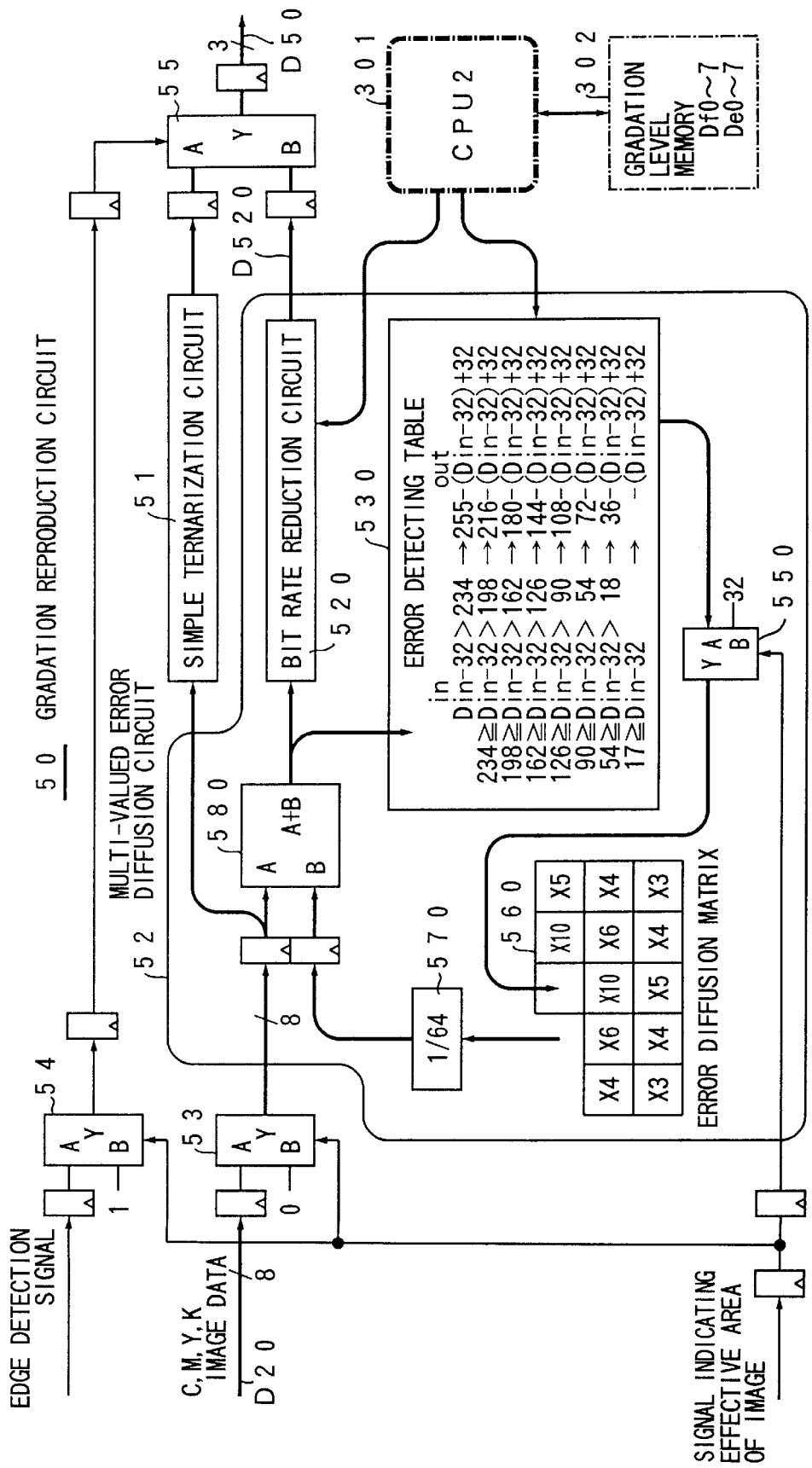
FIG. 8 is a block diagrammatic representation of a gradation reproduction circuit.

FIG. 8 is a block diagrammatic representation of a portion of the gradation reproduction circuit 50 allotted to one of the four colors C, M, Y and K. It will be understood that the circuitry shown in FIG. 8 may be employed for any of the remaining three colors as well.

The image data D20 is provided to the gradation reproduction circuit 50 in synchronism with the clocking of a pixel clock and is held therein until it is further provided to a simple ternarization circuit 51 and a multi-valued error diffusion circuit 52 at a time, the latter of which forms a part of the present invention and, together with the former, subjects the image data D20 to parallel processing. A multiplexer 55 selects either of the outputs from the circuits 51 and 52, combines it with a 1-bit gradation reproduction attribute signal, and outputs an image data D50. The function to be performed by the multiplexer 55, i.e. the function to select either of the outputs from the circuits 51 and 52, is controlled by an edge detection signal, which corresponds to the aforesaid 1-bit gradation reproduction attribute signal. When a pixel is regarded as representing the edge of an image, the output from the circuit 51 is selected, which assumes a value of 0, 128 or 255. The values 0 and 255 are the minimum and maximum values respectively of the dynamic range of the input to the circuit 51, while 128 is the median thereof. When a pixel is not regarded as representing the edge of an image, the output from the circuit 52 is selected, which will be hereinafter more fully described. Another multiplexers 53 and 54 incorporated in the gradation reproduction circuit 50 are so biased that the expected output signal is achieved only when a signal indicating the effective area of an image is received on one input line. The effective area of an image is made up of a document and a margin disposed around it. During the time when the outside of the effective area of an image is scanned, the image data D20 and the edge detection signal are replaced with data representing an invalid area.

The multi-valued error diffusion circuit 52 reduces the number of gradations. For this purpose, the error diffusion method commonly in use for reproducing quasi-gradations may obviously be applied. The multi-valued error diffusion circuit 52 comprises a bit rate reduction circuit 520, error detecting table (i.e. look-up table) 530, multiplexer 550, error diffusion matrix 560, divider 570 and adder 580. The bit rate reduction circuit 520 and error detecting table 530 correspond respectively to the converter and error detecter of the present invention. The function to be performed by the multi-valued error diffusion circuit 52 is briefly summarized in the following paragraph:

In the adder 580, errors received by a pixel from pixels disposed around it are added to an image data D20 outputted from the pixel. The bit rate reduction circuit 520 compares the output from the adder 580 with a threshold value set by the CPU 301 and transforms 256 gradation levels into 8 gradation levels. The value of an error to which this gradation level transformation would give rise can be calculated beforehand. The aggregate of data on errors coming from 256 gradation levels by which the input to the bit rate reduction circuit 520 is represented is given in the error detecting table 530. In order to meet the convenience of implementing the error diffusion method with errors having a positive or a negative value, an offset value is subtracted from, and then added to, each data on the basis of which the error detecting table 530 is prepared. In this embodiment, the offset value is assumed to be equal to 32, which corresponds to the negative value of an error having the greatest absolute value. At the beginning of the error diffusion step, 32 is subtracted from an input value Din, and thereafter an error is found in a tonal range defined by threshold values to be used in the bit rate reduction circuit 520. Lastly, 32 is added to the error. These arithmetic operations are performed by the CPU 301, and the results thereof are downloaded to a memory allotted for the error detecting table 530.

In order to find an error for the subsequent pixel, the output from the adder 580 is provided to the error detecting table 530, from which an error is taken. The value of this error is a function of the input thereto. The function performed by the multiplexer 550 is to fix an error to a definite value, e.g. to 32, in areas other than the effective area of an image.

The error diffusion matrix 560 is a functional device by which each error caused by the aforesaid gradation level transformation is distributed among pixels disposed around the pixel involved after being multiplied by weight factors. For the sake of simplicity, integers are used as the weight factors. In the divider 570, the output from the error diffusion matrix 560 is divided by the sum of all terms of weight factors. It is not necessary to subject negative values to arithmetic operations in the error diffusion matrix 560, because all errors have already been allowed to swing positive by virtue of the aforesaid subtraction and addition of the offset value at the time of setting the contents of the error detecting table 530. Consequently, the circuit arrangement scheme can be of simple and compact design and permits high-speed arithmetic operations. The error diffusion method requires that the errors to be received by a pixel from pixels disposed around it should be calculated before an image data D20 is transmitted from the pixel to the error diffusion matrix 560. Therefore, the speed at which the image data is transferred from the pixel to the error diffusion matrix 560 depends on the time required for implementing the error diffusion. The error diffusion matrix 560 capable of high-speed arithmetic operations serves to improve the speed at which a copy of a document is taken.

Figure 9:
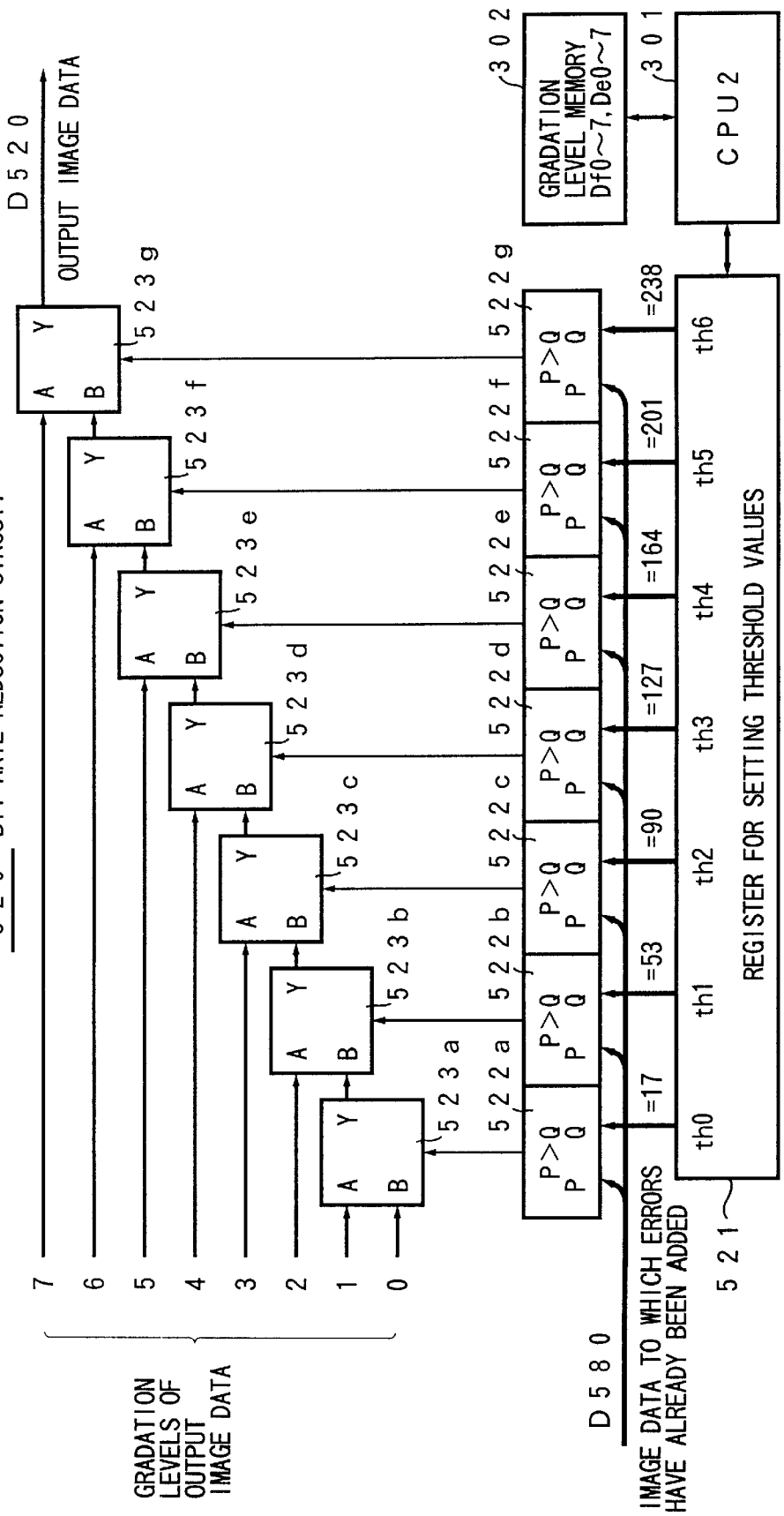
FIG. 9 is a block diagrammatic representation of a bit rate reduction circuit.

FIG. 9 is a block diagrammatic representation of the bit rate reduction circuit 520.

The bit rate reduction circuit 520 comprises a register 521 for setting threshold values, comparators 522*a* to 522*g*, and multiplexers 523*a* to 523*g*. Threshold values th0 to th6 are loaded from the CPU 301 into the register 521. An image data D580, to which errors have already been added, is distributed among the comparators 522*a* to 522*g*, to which the threshold values th0 to th6 respectively are also transmitted from the register 521. Each of the multiplexers 523*a* to 523*g* selects one of the two choices, i.e. two output gradation levels, in accordance with the result of a comparison made by each of the comparators 522*a* to 522*g* between the image data D580 and each of the threshold values th0 to th6. The threshold values th0 to th6 are examples of parameters of the present invention.

The default threshold values th0 to th6 are 17, 53, 90, 127, 164, 201 and 238 respectively, by which the dynamic range of the image data D580 is substantially divided into eight equal parts. Table 1 illustrates the correspondence between the gradation levels of the input image data and those of the output image data under the condition that the aforesaid default threshold values are applied. In this case, 32, 64, 96, 128, 160, 192 and 224 will be hereinafter referred to as the "specific gradation levels of an input image data", which are disposed approximately medially of the respective tonal ranges of the input image data partitioned by the threshold values th0 to th6 and which yield an effect of reducing the errors to zero at the time of gradation level transformation.

TABLE 1

| Input gradation levels | | Output gradation levels |
|---|---|---|
| 0~17 | → | 0 |
| 18~53 | → | 1 |
| 54~90 | → | 2 |
| 91~127 | → | 3 |
| 128~164 | → | 4 |
| 165~201 | → | 5 |
| 202~238 | → | 6 |
| 239~255 | → | 7 |

Figure 10:
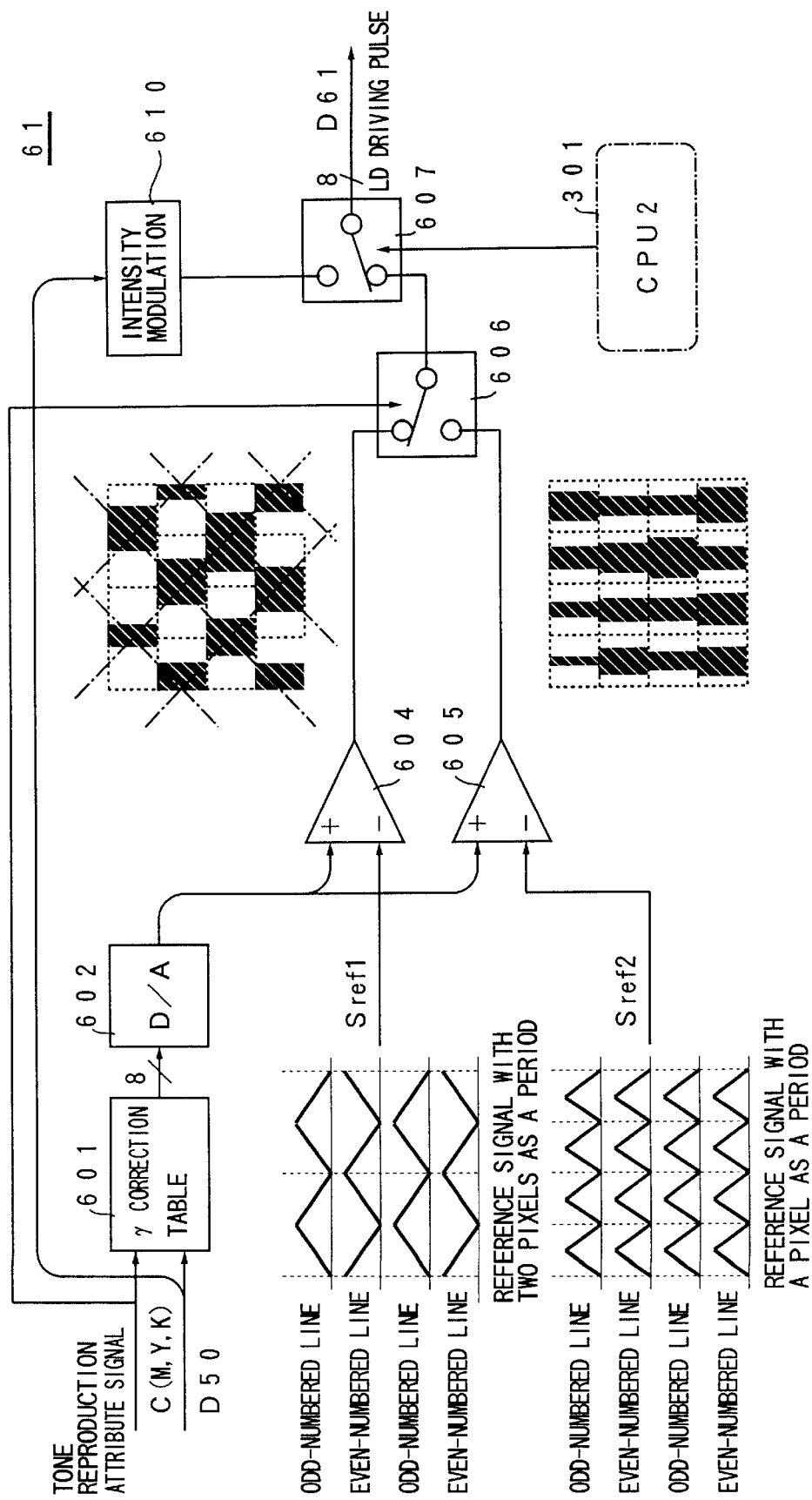
FIG. 10 is a block diagrammatic representation of a control circuit for γ correction and PWM.
Figure 11:
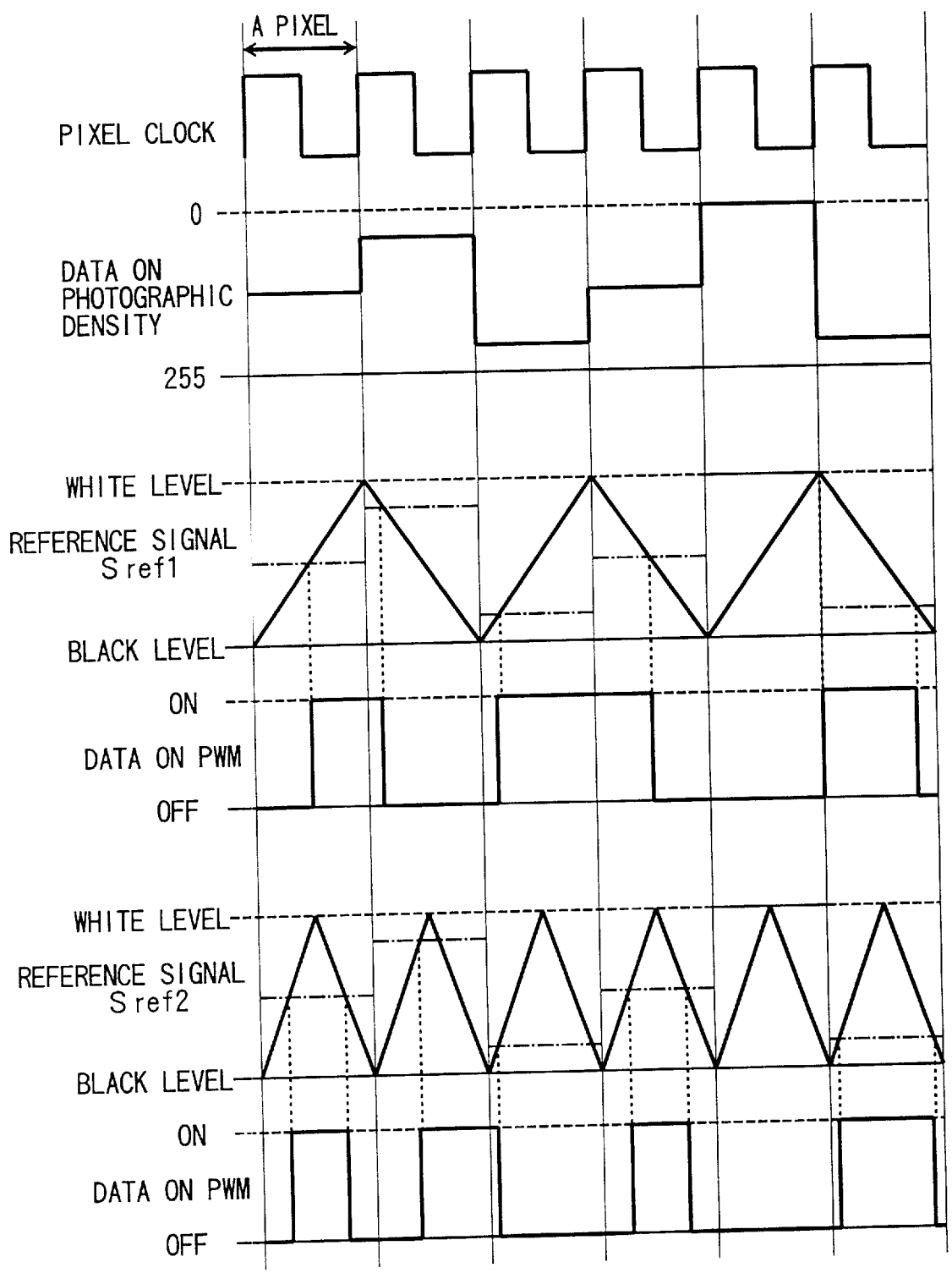
FIG. 11 is a view of an illustrative example of waveforms obtained from PWM.

FIG. 10 is a block diagrammatic representation of the control circuit 61 (FIG. 7) for γ correction and PWM. FIG. 11 is a view of an illustrative example of waveforms obtained from PWM. The construction of the control circuits 62 to 64 allotted respectively to M, Y and K corresponds to that of the control circuit 61 allotted to C and, consequently, does not require any more detailed explanation.

The image data D50 received from the gradation reproduction circuit 50 is subjected to γ correction in a γ correction table 601 and converted to an 8-bit data. A digital-to-analog converter 602 accepts it as an input signal and converts it to an analog data on image density, which is provided to two comparators 604 and 605. A reference signal Sref1 provided to the comparator 604 is a triangular pulse with two pixels as a period. Another reference signal Sref2 provided to the comparator 605 is a triangular pulse with a pixel as a period. Each of the comparators 604 and 605 makes a comparison between the analog data on image density and the reference signal Sref1 or Sref2 and transmits a data on PWM to a multiplexer 606 in accordance with the result of the comparison. This means that an exposure pattern for each pixel is determined in accordance with the magnitude of the analog data on image density. The multiplexer 606 selects one of the two outputs from the comparators 604 and 605 in accordance with the gradation reproduction attribute signal "H" or "L", and provides the selected one to another multiplexer 607. The gradation reproduction attribute signal "H" indicates an area of continuous gradation rendition. In this case, PWM is effected with two dots as a period so as to make the gradation reproduction smoother. The gradation reproduction attribute signal "L" indicates an edge. In this case, PWM is effected with one dot as a period so as to make the edge sharp. Such an automatic changeover of mode of modulation serves to improve picture quality. In case of PWM effected with two dots as a period, improvement in the graininess of an image is attained by allowing the reference signals Sref1 for odd-numbered lines to be in quadrature with those for even-numbered lines, and this quadrature in turn is attained by tilting the lines constituting a screen frequency so as to allow them to make an angle of 45° with a horizontal plane.

The image data D50 received from the gradation reproduction circuit 50 is provided also to an intensity modulation circuit 610 and converted to a data on intensity modulation, the signal level of which changes in accordance with image density. The multiplexer 607 selects either the data on PWM received from the multiplexer 606 or the data on intensity modulation received from the intensity modulation circuit 610. The CPU 301 gives a command to effect this selection. The output from the multiplexer 607 is an LD driving pulse D61 for use in controlling the light emission of the semiconductor laser 71 (FIG. 7).

Data Processing

An important feature of this embodiment is that the belt 34 is provided with series of AIDC patterns in such positions as to pass under both end portions of the photoreceptors 81 to 84 and that the image densities of the AIDC patterns are measured so that the result of measurement may be reflected in the correspondence between 256 gradation levels of the input to the gradation reproduction circuit 50 and 8 gradation levels of the output therefrom and thereby the density type gradation reproduction for C, M, Y and K may be kept constant. An effective way of allowing the result of measurement to be reflected in the aforesaid correspondence is to change the threshold values th0 to th6 (FIG. 9) to be loaded from the CPU 301 into the bit rate reduction circuit 520 and rewrite the error detecting table 530 (FIG. 8) so as to change the aforesaid specific gradation levels of an input image data. The provision of the AIDC patterns serves to make the gradation reproduction of an image uniform all over even if the internal environment of the copying machine 1 is made uneven and notwithstanding the fact that electrophotography is apt to be swayed by environmental influence such as temperature and humidity.

Figure 12:
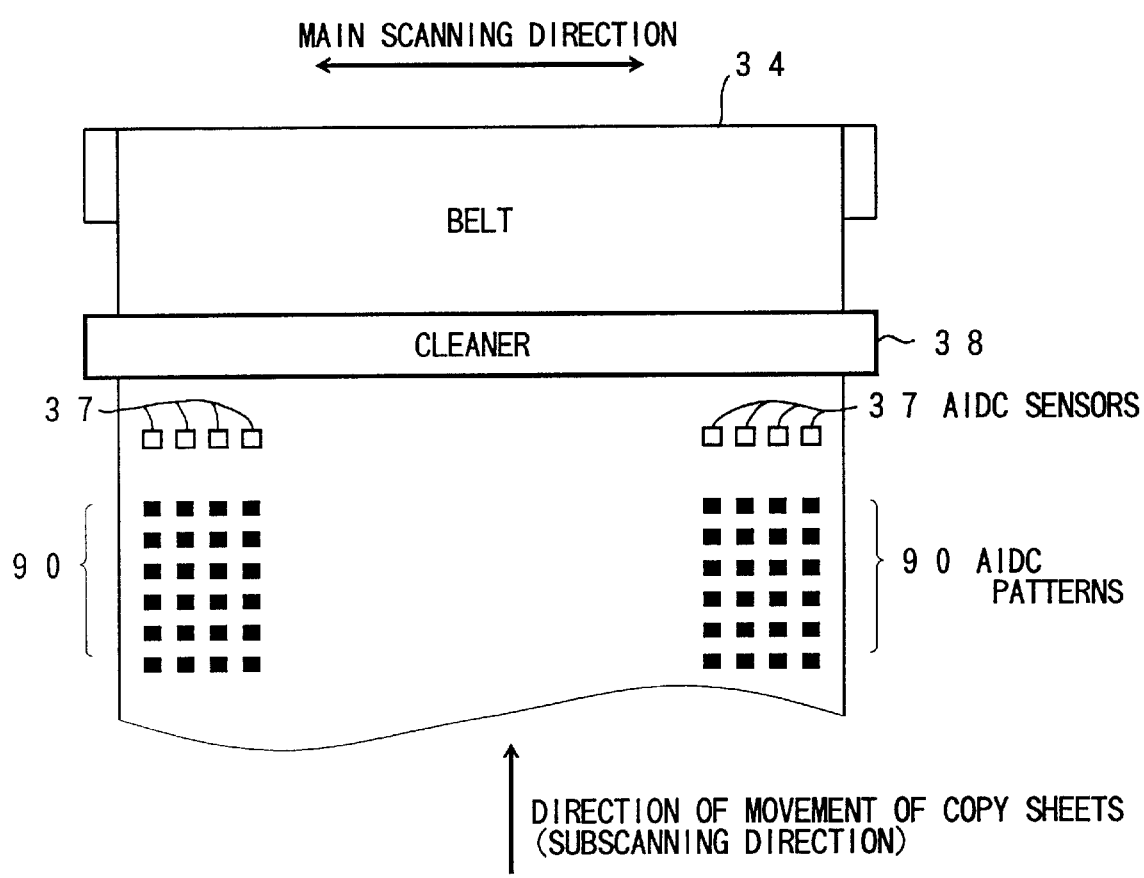
FIG. 12 is a schematic representation to help explain how AIDC patterns occupy the positions by way of example.

FIG. 12 is a schematic representation to help explain how AIDC patterns 90 occupy the positions by way of example.

Two areas in which the AIDC patterns 90 are formed are disposed close up to the two longitudinal edges respectively of the belt 34. In each area, the AIDC patterns 90 are arranged in column of four files in the subscanning direction. These four files are allotted to C, M, Y and K respectively. In this embodiment, each file consists of six AIDC patterns 90 having different image densities from each other. This means that 24 AIDC patterns are formed in an area and that the total number of AIDC patterns amounts to 48, each of which is of square formation with an area of about one square centimeter. Four AIDC sensors 37 are allotted to the aforesaid four files respectively so that each AIDC sensor 37 may be allowed to detect the image densities of six AIDC patterns 90 one after another.

Figure 13:
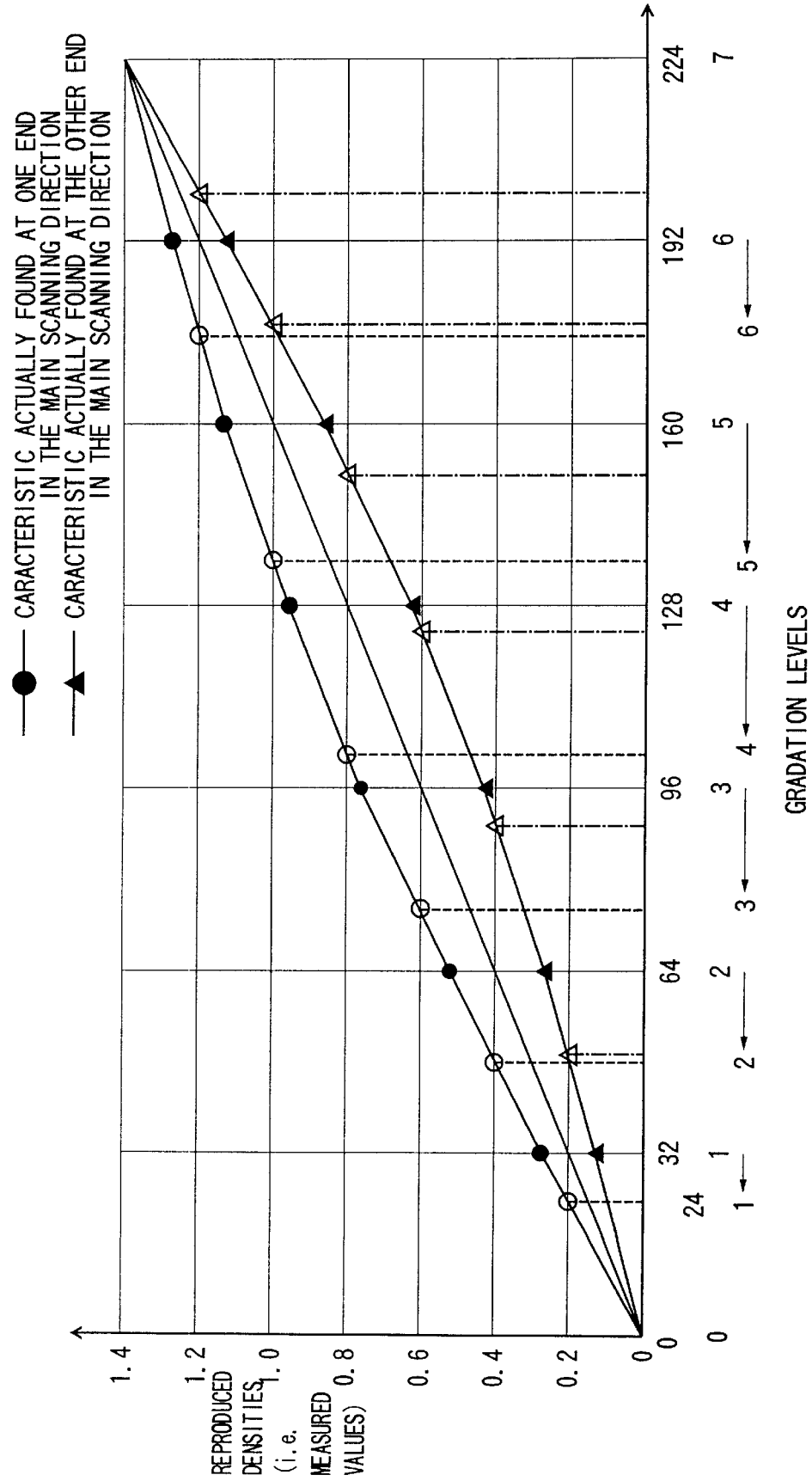
FIG. 13 is a view to help explain the procedures for changing the setting for the purpose of gradation level transformation.

FIG. 13 is a view to help explain the procedures for changing the setting for the purpose of gradation level transformation.

As has been above explained, 0, 32, 64, 96, 128, 160, 192 and 224 have been designated as the specific gradation levels of an input image data, which yield an effect of reducing the errors to zero at the time of gradation level transformation from 256 gradations to 8 gradations in an initial state subsequent to the energization of the copying machine 1. The aforesaid six AIDC patterns 90 of which each file consists are prepared on the basis of six out of the aforesaid eight specific gradation levels of an input image data, i.e. those excluding 0 and 224, and the image densities of these six AIDC patterns 90 are measured. An error to be distributed among pixels disposed around the pixel involved is reduced to zero when the error diffusion method is conducted with the specific gradation levels of an input image data. In this case, therefore, all pixels constituting an AIDC pattern 90, the number of which amounts to about $160^2$ in case of 400 dpi, have an identical exposure pattern.

The specific gradation levels of an input image data can be regarded as the gradation levels of an output image data which has a dynamic range of 0 to 7 and which has failed to be subjected to quasi-gradation reproduction.

Photographic densities to be reproduced in case of the respective specific gradation levels of an input image data are predetermined in the design phase of the copying machine 1 so as to allow the gradation reproduction to have a linear characteristic. For example, the target density is 0.2 when the specific gradation level of an input image data is 32. However, there are some cases where a change in environment and/or aged deterioration of component parts causes an actually reproduced density to deviate from the target density. FIG. 13 provides an example of one of such cases. However, this example is to be considered as merely imaginary and not as implying that it is liable to occur. In FIG. 13, black dots represent measured values obtained at one end in the main scanning direction (e.g. at the front side of the copying machine 1) and indicate that rather dark gradations are reproduced, while black triangles represent measured values obtained at the other end in the main scanning direction (e.g. at the rear side of the copying machine 1) and indicate that rather light gradations are reproduced.

On the basis of the measured value of an image density, a gradation level corresponding to a target density is inferred, e.g., from linearity virtually introduced into a gradation reproduction characteristic to be actually found in the region between two succeeding specific gradation levels of an input image data. The gradation level thus inferred is set as a new specific gradation level of the input image data. In FIG. 13, the inferred gradation levels are represented by white dots and white triangles lying on horizontal lines disposed in equidistantly spaced parallel relation with each other. The white dots represent the inferred gradation levels at the front side of the copying machine 1, while the white triangles represent the inferred gradation levels at the rear side of the copying machine 1. Let it be assumed that, at the front side of the copying machine 1, the gradation level of an input image data is 24 when the target density is 0.2. Then the specific gradation level of the input image data has to be changed from 32 to 24 when the gradation level of an output image data is to be 1. The specific gradation levels of an input image data for the front side of the copying machine 1 may be separated from those for the rear side. Alternatively, an approximate gradation reproduction characteristic may be based on an average value formed from measured values obtained at the front and rear sides respectively so that the specific gradation level of an input image data corresponding to a target density may be calculated therefrom.

The aforesaid six AIDC patterns 90 of which each file consists are prepared over again on the basis of new specific gradation levels of an input image data, and the image densities of these six AIDC patterns 90 are measured. Correction of the specific gradation levels of an input image data based on the measurement of image densities is repeated until the correction has been repeated as many times as predetermined or until the difference between the target density and the measured value falls within an allowable limit. As will be appreciated, a most favorable gradation reproduction characteristic will be obtained from such a repetition of correction.

In brief, the procedures for changing the setting for the purpose of gradation level transformation reside in obtaining an approximate gradation reproduction characteristic from an actually found gradation reproduction characteristic to the end that the gradation levels of an input image data corresponding to a target density may be found from the approximate gradation reproduction characteristic. It is of prime importance, therefore, that the number of bits constituting the gradation levels and the reproduced densities for use in arithmetic operations to be performed for attaining the aforesaid end should be greater than the number of bits constituting the gradation levels of an output image data, i.e., should be greater than 3 bits in case of this embodiment. No room would be left for changing the specific gradation levels of an input image data if the gradation levels to be obtained from measuring the AIDC patterns 90 and the gradation levels of an output image data were constituted by the same number of bits, i.e. by 3 bits having a dynamic range of 0 to 7 in case of this embodiment. The degree of accuracy in obtaining an approximate gradation reproduction characteristic and calculating the gradation levels corresponding to a target density is proportional to the number of bits constituting the gradation levels and the reproduced densities for use in the aforesaid arithmetic operations. Let it be assumed that the gradation levels are plotted on the abscissa with a cell width of 0.1. Then, when an inferred gradation level is somewhere between 23.5 and 24.4, the specific gradation level of an input image data can be set at 24 and, when an inferred graylevel is somewhere between 24.5 and 25.4, the specific gradation level of an input image data can be set at 25.

The manner in which the printer 30 is controlled by the CPU 301 will now be described with reference to FIGS. 14 to 18.

Figure 14:
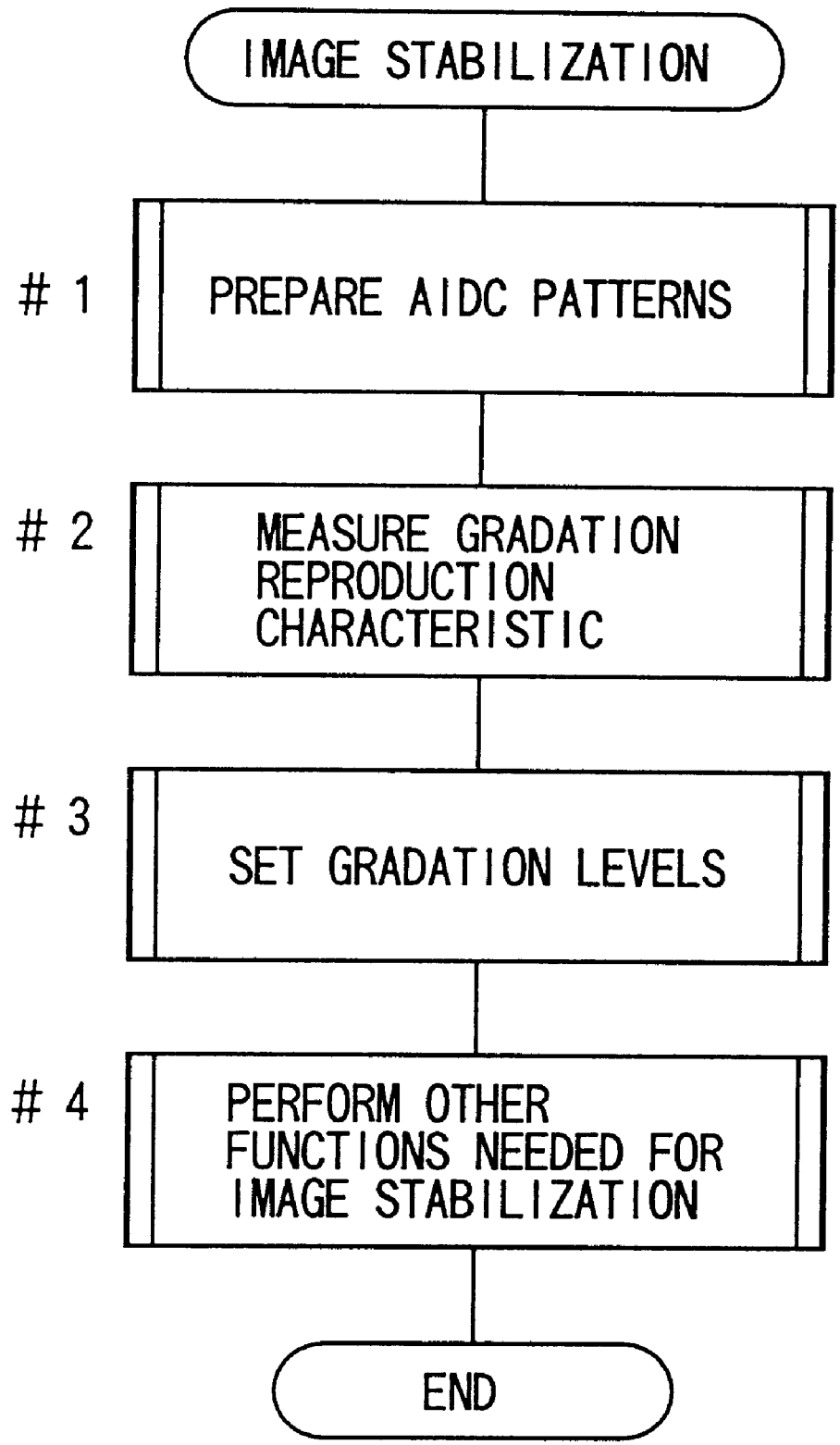
FIG. 14 is a flow chart representing successive steps in a typical practice of image stabilization.

FIG. 14 is a flow chart representing successive steps in a typical practice of image stabilization.

The routine shown in FIG. 14 is executed at the time of the energization of the copying machine 1, at the time when the first copy of a document has been taken subsequently to the energization, at the time when copying on a predetermined number of copy sheets has been accomplished, after the lapse of predetermined time which has been set in a timer, or at the time when any other predetermined condition has been fulfilled.

The CPU 301 gives a command to prepare the AIDC patterns 90 (step 1), measure the gradation reproduction characteristic (step 2), set the gradation levels (step 3), and perform other functions needed for image stabilization (step 4) such as supply of toner powder and output control over a corona generating device.

Figure 15:
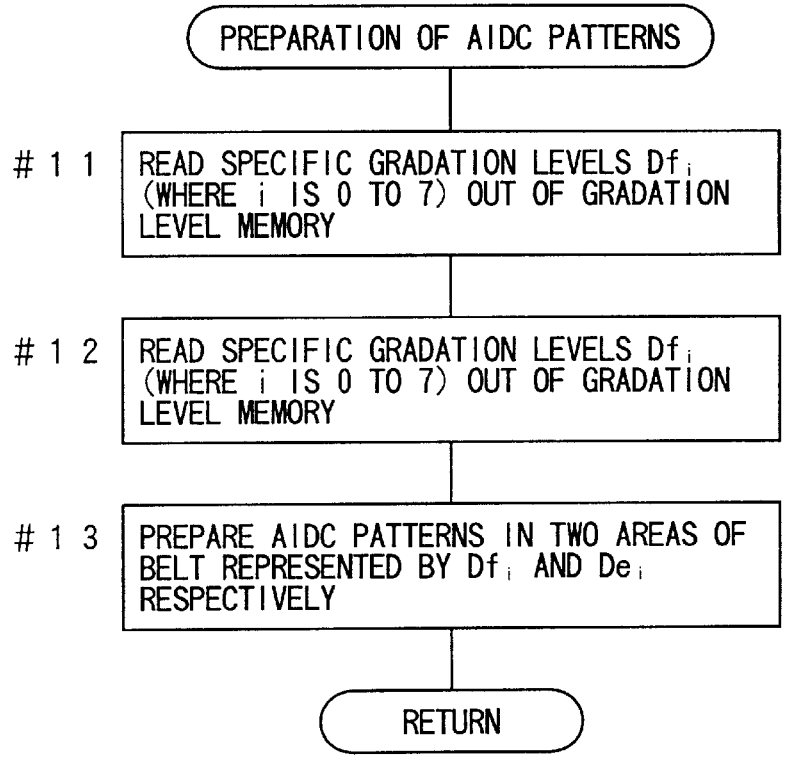
FIG. 15 is a flow chart representing only that section of FIG. 14 which pertains to the preparation of AIDC patterns.

FIG. 15 is a flow chart representing only that section of FIG. 14 which pertains to the preparation of AIDC patterns.

Values $Df_0$ to $Df_7$ representing the newest specific gradation levels of an input image data obtained from one of the two areas disposed close up to the two longitudinal edges respectively of the belt 34 are read out of a gradation level memory 302 (FIG. 8) (step 11). Then, values $De_0$ to $De_7$ representing the newest specific gradation levels of an input image data obtained from the other of the two areas are read out of the gradation level memory 302 (step 12). Then the AIDC patterns 90 are prepared in these two areas in such a manner as has been above explained with reference to FIG. 12 (step 13).

Figure 16:
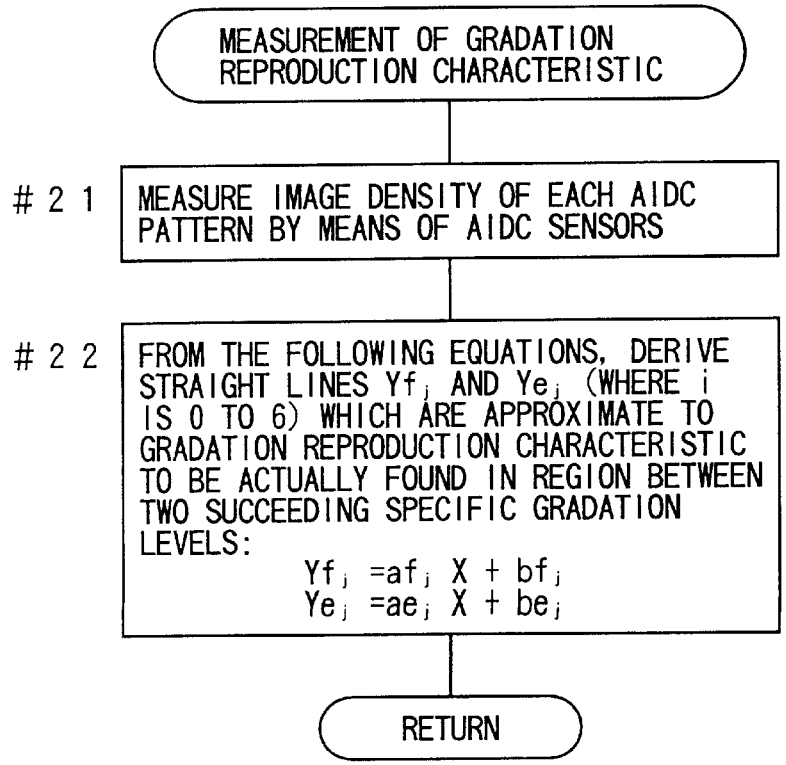
FIG. 16 is a flow chart representing only that section of FIG. 14 which pertains to the measurement of a gradation reproduction characteristic.

FIG. 16 is a flow chart representing only that section of FIG. 14 which pertains to the measurement of a gradation reproduction characteristic.

The output from each of the AIDC sensors 37 is periodically fetched, and the image density of each AIDC pattern 90 is measured (step 21). Straight lines $Yf_j$ and $Ye_j$ are found on the basis of results obtained from the aforesaid measurement. Each of these two straight lines represents linearity virtually introduced into a gradation reproduction characteristic to be actually found in the region between two succeeding specific gradation levels of an input image data in each of the aforesaid two areas (step 22).

Figure 17:
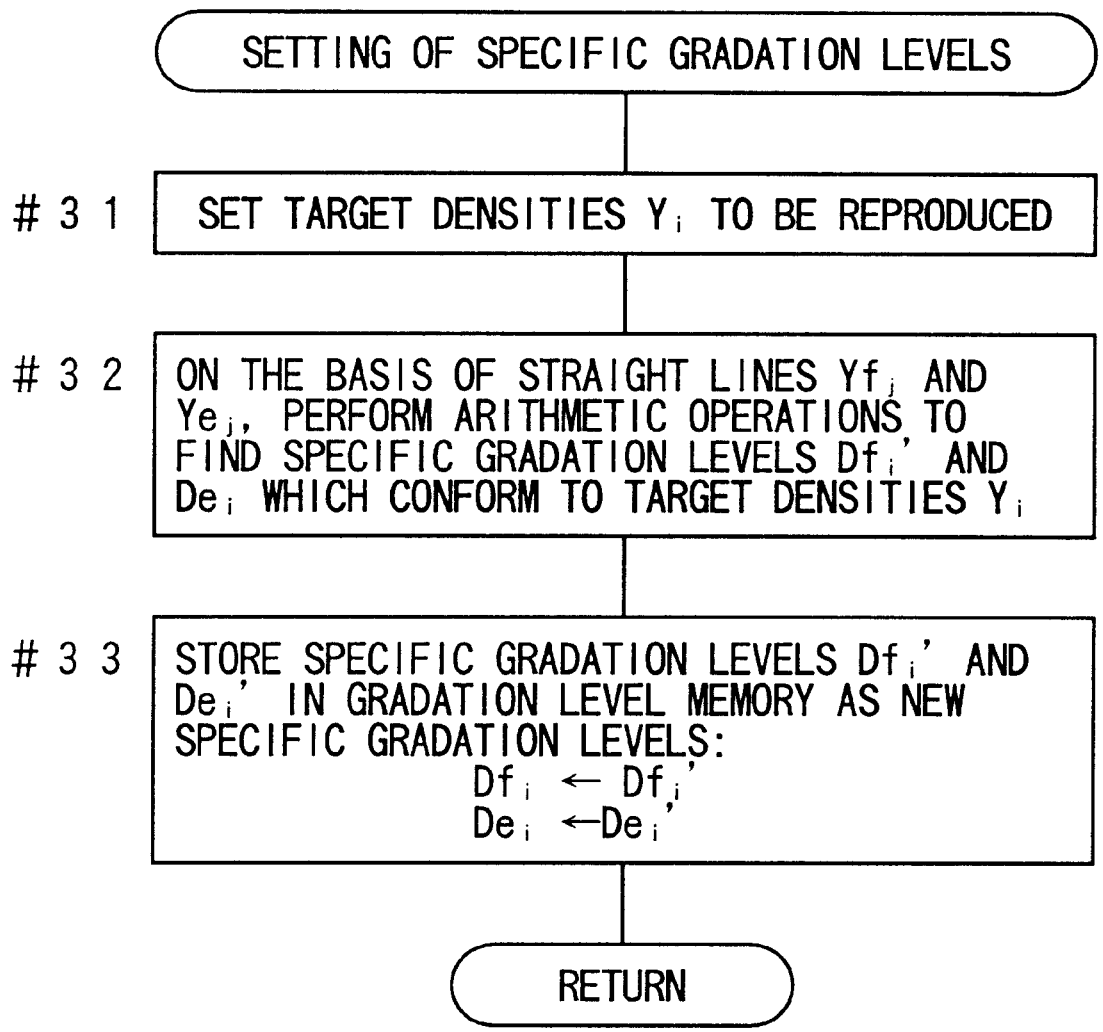
FIG. 17 is a flow chart representing only that section of FIG. 14 which pertains to the setting of specific gradation levels.

FIG. 17 is a flow chart representing only that section of FIG. 14 which pertains to the setting of specific gradation levels.

Target densities $Y_0$ to $Y_7$ to be reproduced are set (step 31), on the basis of which, together with the straight lines $Yf_j$ and $Ye_j$, arithmetic operations are performed to find the specific gradation levels $Df_0'$ to $Df_7'$ and $De_0'$ to $De_7'$ of an input image data which conform to an actual gradation reproduction characteristic (step 32). The specific gradation levels thus obtained are stored in the gradation level memory 302 as the new specific gradation levels of the input image data (step 33).

Figure 18:
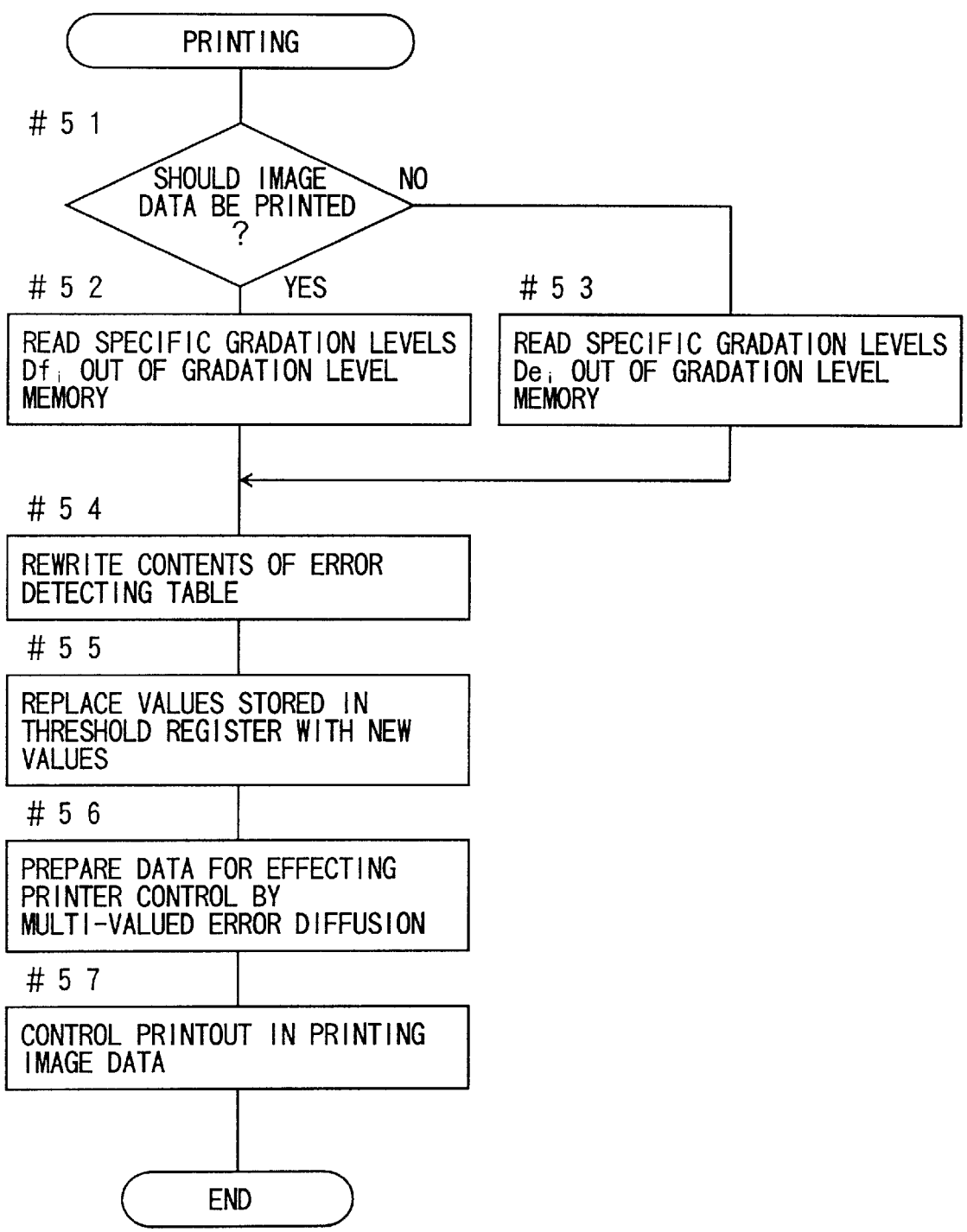
FIG. 18 is a flow chart representing successive steps in a typical practice of printing.

FIG. 18 is a flow chart representing successive steps in a typical practice of printing.

The routine shown in FIG. 18 is activated in response to an image of a document received from the image reader 20 or in response to a request from an external device for printing an image transmitted therefrom.

The specific gradation levels $Df_0$ to $Df_7$ are read out of the gradation level memory 302 when image data are to be printed within a range between the starting point and the midpoint of a main scanning line (steps 51 and 52). The specific gradation levels $De_0$ to $De_7$ are read out of the gradation level memory 302 when image data are to be printed within the remaining range of the main scanning line (steps 51 and 53).

The threshold values th0 to th6 (FIG. 9) are set in accordance with the specific gradation levels thus read out, and the contents of the error detecting table 530 (FIG. 8) are rewritten (step 54). Values stored in the register 521 (FIG. 9) for setting threshold values are replaced with new values. Multi-valued error diffusion for controlling the gradation reproduction circuit 50 (FIG. 7) (step 56) and printer control for controlling electrophotography (step 57) are executed.

A particular advantage obtained from the foregoing embodiment of the invention resides in the fact that the desired density reproduction characteristic can be realized by rewriting the threshold values th0 to th6 for bit rate reduction and the contents of the error detecting table 530. Thus the density reproduction characteristic is allowed to approach a linear characteristic on the basis of results obtained from the measurement of the image density of each AIDC pattern 90. Furthermore, a highlighted portion of a document can be subjected to gradation reproduction in preference to other portions so that the threshold values may have smaller cell intervals in the highlighted portion than in other portions.

While this invention has been described particularly in connection with the AIDC patterns 90 formed in two areas, it will of course be apparent to those skilled in the art that they may be formed in three or more areas arranged in the main scanning direction so that the density gradient in that direction may be measured more precisely and reflected in the setting of values for gradation level transformation.

Instead of 256 used as the number N of gradations of the input image data D20 provided to the gradation reproduction circuit 50 and 8 used as the number M of gradations of the output image data D50 taken from the gradation reproduction circuit 50, it is also possible to allow n and/or m to assume any value as the number of bits for the image data so far as the inequality N>M is satisfied.

In addition to the aforesaid advantage, further advantages of the invention are that constant gradation reproduction can be effected, that images stable in quality can be printed out, and that gradation reproduction throughout an entire image can be made uniform.

What is claimed is:

1. An apparatus for forming an image comprising:
   an error diffusion circuit adapted to apply an error diffusion method to input image data having N gradations so as to convert it into image data having M gradations and output the same, wherein said error diffusion circuit includes a converter for comparing said image data having N gradations with at least one threshold value which can be varied and converting said image data into image data having M gradations;
   a printing device adapted to receive said image data having M gradations outputted from said error diffusion circuit and print an image on the basis thereof; and
   a controller for setting parameters to be used for data processing to be carried out in said error diffusion circuit, said parameters being set in accordance with an image density of at least one test pattern printed in said printing device;
   wherein said threshold value is set by said controller in accordance with the image density of said test pattern.

2. An apparatus for forming an image as defined in claim 1, wherein said error diffusion circuit comprises:
   an adder for adding errors coming from gradation transformation executed with respect to image data of pixels disposed around a central pixel to be converted to an image data of the central pixel;
   a converter for comparing an output from said adder with threshold values and converting said output into an image data having M gradations;
   an error detector for calculating an error to which said conversion executed in said converter gives rise; and
   an error diffusion matrix for diffusing said error calculated in said error detector.

3. An apparatus for forming an image as defined in claim 1, wherein said controller causes a plurality of said test patterns to be formed in each of a plurality of areas in said printing device.

4. An apparatus for forming an image as defined in claim 3, wherein said controller varies said threshold value in accordance with image densities of said test patterns and in accordance with positions in which said image data is printed out.

5. An apparatus for forming an image as defined in claim 1, wherein said controller causes a plurality of said test patterns to be formed, each of said test patterns having a different gradation level from others.

6. An apparatus for forming an image as defined in claim 5, wherein said controller calculates a gradation level from an image density of each of said test patterns having a different gradation level from others, said gradation level to be calculated by said controller being such that a desired density is obtainable therefrom and that said threshold value to be set is to be based thereon.

7. An apparatus for forming an image as defined in claim 1, wherein, in performing arithmetic operations for finding said threshold value, said controller uses a larger number of bits than those necessary and sufficient for allowing said output image data to have M gradations.

8. An apparatus for forming an image as defined in claim 2, wherein said controller causes a plurality of said test patterns to be formed in each of a plurality of areas in said printing device.

9. An apparatus for forming an image as defined in claim 8, wherein said controller varies said threshold values in accordance with image densities of said test patterns and in accordance with positions in which said image data is printed out.

10. An apparatus for forming an image as defined in claim 1, wherein image data having gradation levels which do not give rise to errors in said conversion executed in said error diffusion circuit are transmitted from said controller to said printing device so that said test patterns may be formed on the basis of said image data.

11. An apparatus for forming an image as defined in claim 1, wherein said controller causes a plurality of said test patterns to be formed, each of said test patterns having a different gradation level from others.

12. An apparatus for forming an image as defined in claim 11, wherein said controller calculates a gradation level based on an image density of each of said test patterns having a different gradation level from others, and sets the threshold value based on the gradation level calculated by said controller.

13. A method of forming an image, wherein image data processed by an error diffusion method are printed out, comprising the steps of:

supplying a printing device with image data having specific gradation levels so that a test pattern may be formed on the basis of said image data;

measuring an image density of said test pattern;

setting a threshold value for use in error diffusion, said threshold value being set in accordance with said image density of said test pattern;

comparing an image data having N gradations with said threshold value, converting said image data into an image data having M gradations, and outputting the same, said conversion being executed by an error diffusion method; and supplying said printing device with said image data having M gradations and permitting said printing device to print out said image data.

14. A method of forming an image as defined in claim 13, wherein said supplying step includes a step of forming a plurality of said test patterns in each of a plurality of areas in said printing device.

15. A method of forming an image as defined in claim 14, wherein said setting step includes a step of varying said threshold value in accordance with image densities of said test patterns and in accordance with positions in which said image data is printed out.

16. A method of forming an image as defined in claim 13, wherein said supplying step includes a step of forming a plurality of said test patterns, each of said test patterns having a different gradation level from others.

17. A method of forming an image as defined in claim 16, wherein said setting step includes a step of calculating, a gradation level from an image density of each of said test patterns having a different gradation level from others, said gradation level to be calculated being such that a desired density is obtainable therefrom and that each of said threshold values to be set is to be based thereon.

* * * * *